UNITED STATES PATENT OFFICE.

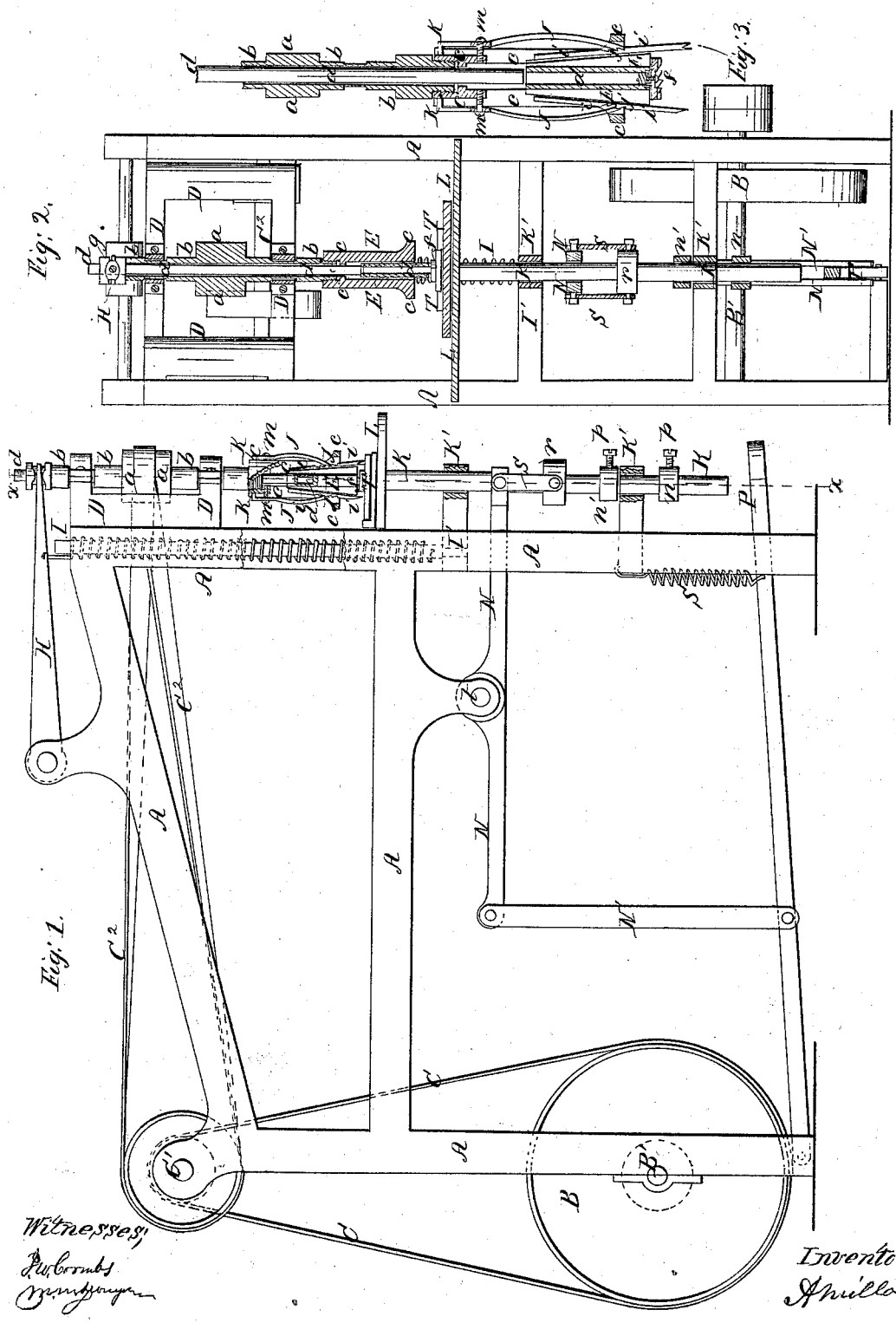

ALEXANDER MILLAR, OF NEW YORK, N. Y.

CORK-MACHINE.

Specification of Letters Patent No. 32,075, dated April 16, 1861.

*To all whom it may concern:*

Be it known that I, ALEXANDER MILLAR, of New York, in the county and State of New York, have invented certain new and useful Improvements in Machinery for Cutting Pot-Corks, Bungs, &c.; and I do hereby declare that the following is a full, clear, and exact description thereof, reference being had to the accompanying drawings, making a part of this specification, in which—

Figure 1 is a side elevation of the machine for cutting corks showing the cutting parts which carry the cutters in transverse sections: Fig. 2 is a transverse section taken through the front part of the machine, in the plane indicated by the red line $x$ $x$ in Fig. 1. Fig. 3 is a vertical transverse section taken through the holding and cutting parts of Figs. 1, and 2, showing the parts enlarged.

Similar letters of reference indicate corresponding parts in all the figures.

The object of this invention is to cut from square blanks the common pot corks, bungs, or all kinds of corks and bungs which cannot be practically made in the bottle cork cutting machine.

My invention relates to certain novel improvements in the expanding cutters which form the subject of the Patent No. 17,557, and it also relates to an improvement in operating the table or bed on which the work to be cut by the rotary cutters is placed, for feeding the work up to the cutters, with a positive pedal movement.

The improvements in the aforementioned expanding cutters consist, firstly, in pivoting the "holder" to the lower end of a rod which passes vertically through the center of the tapering guide-block, and through the stock of the cutters and through the spindle or shaft which rotates the cutter-stock, as will be hereinafter described, and in the employment of an adjustable nut and spring arm in conjunction with said rod for giving the requisite degree of pressure upon the work during the operation of the cutters in forming the cork as will be hereinafter described.

The invention consists, secondly, in forming rack teeth on the outside of, and at suitable points on, the knife-bars, and in using for each knife-bar a spring, which is capable of receiving a lateral adjustment, and which has a tooth, or hook, on its lower end which engages with teeth on the knife bar and confines said bar securely in its place against the tapering edge of the guide block, and allows the knife bar to be moved downward to compensate for the wearing away of the knife, as will be hereinafter described.

The invention consists, thirdly, in operating the table or bed on which the work to be cut is placed, by means of a system of levers which are jointed to a vertical bar on which the table is mounted, in combination with adjustable collars which are placed on the vertical table-bar and used to regulate the vertical movement of the table, all as will be hereinafter described.

To enable those skilled in the art to make and use my invention, I will proceed to describe its construction and operation.

A represents the frame-work of the machine; B is the main driving pulley, which is secured to the transverse driving shaft B'; C is a belt which transmits rotary motion to the pulley shaft C'; and $C^2$ is a belt which transmits rotary motion from shaft C', to the belt wheel $a$, which latter wheel is keyed to the upper part of the vertical spindle $b$, to which the cutter stock $c$, is secured. A loose belt wheel is placed on the shaft C' for the purpose of "throwing off" the belt $C^2$, and thus stopping the motion of the spindle $a$, at pleasure.

The spindle $b$, has its bearings in the large head block D, which projects out from the front end of the frame A, and which is secured to the top part of this frame, and this spindle is allowed to rotate freely in its end bearings, but it is not allowed to have any vertical play. The belt pulley $a$, is placed between the upper, and lower bearings of the spindle $b$, as clearly shown in Figs. 1 and 2 of the drawings. The spindle $b$ is hollow and its lower end is secured into the upper end of the cutter-stock $c$ by a left hand screw, shown in the section, Figs. 1, 2 and 3. The cutter stock $c$, is also hollow, that is to say, it has a hole through its axis corresponding in diameter to the hole through the axis of the spindle $b$. This cutter stock $c$, is somewhat larger in diameter than the spindle, $b$, to which it is screwed, and it is made with a flaring or bell shaped mouth, at its lower end. A slot is cut transversely through this cutter-stock, of a suitable width to receive a block E, and this slot extends from the lower end of the cutter-stock nearly to the upper end thereof as shown in Figs. 1, 2 and 3 of the drawings. This slot which is cut through the stock $c$ receives the tapering block E, and allows this block, to be moved freely up and down, at the same time the slot, together with the central hole through the stock, prevents the block from having any lateral movement. A hole somewhat smaller in diameter to the hole through the spindle b, and through the upper end of the stock, is made vertically through the center of the block E, and one end of a round rod d is passed through the hole in this block and a holder f which is simply a circular piece of metal with points or serrations formed on its lower surface, is attached to the end of the rod d as shown in Fig. 3 by a screw, which will allow the holder to rotate. That portion of the rod d which passes through the block E is smaller than its upper portion, and the shoulder on the rod d bears on the top and smaller end of the block, so as to keep the block down to the work, as will be hereinafter explained. The block E, thus being attached to the rod d, so that it will be allowed to rotate around this rod, and so that its sides will taper upward, the upper end of rod d, is passed up through the stock c, and through the spindle b, as shown in Figs. 1, 2 and 3, and the block E is brought within the slot in the stock c. The upper end of rod d, projects from the top of the spindle b, and receives a collar g, which has notches cut in its side; and this collar is secured to the rod d, at the desired point, by a set screw, or in any other suitable manner. The notches in the sides of the collar g, receive the bifurcated end of a pressure arm H, Fig. 1, which extends horizontally back from the collar and is pivoted at its rear end to the top of frame A. This arm H, is acted upon with a downward pressure by the helical spring I, which spring is attached at its upper end to said arm and at its lower end to a cross bar I', which is below the lower end of the cutter stock c. The vertical rod which is represented in Fig. 1, as passing through the center of spring I, serves only to keep this spring straight. In this manner the rod d, is constantly acted upon by a pressure which has a tendency to force it downward and keep it, with the block E, in the position represented in Figs. 1, 2 and 3. The adjustable collar g is held down on the top end of the spindle b by the spring I, through arm H and this collar by being adjusted up or down on the bar d will shorten or lengthen this bar according to the thickness of the stuff to be cut.

On each side—the tapering sides—of the block E, is placed a knife I, such as are commonly employed in the bung cutters—and these knives project beyond the lower end of the stock c a suitable distance, and their inside surfaces are held snugly and securely against the block E, by means of the springs J, J, which springs allow the knives to be forced apart by the block E, in its upward movement, and in the downward movement of the block E, the springs will force each knife toward the axis of this block E. It is necessary that the springs J, J, should hold these knives i, i, in such a way that they will not be liable to move endwise during the operation of cutting, and it is desirable that these knives should each be made adjustable lengthwise so that provision will be made for their wear and for sharpening them. To this end the knife bars J, J, have teeth j, j, cut on their outside surfaces, which teeth are pitched upward as clearly shown in Fig. 3; and into these teeth the lower ends of the springs J, J, engage. These knives i, i, will thus be held by the springs and prevented from being forced upward during the operation of cutting, but the springs will allow the knives to be drawn downward and their cutting points set as far below the lower end of the stock e, as may be found desirable.

The springs which hold the knives i, i, against the tapering edges of the block E, are unlike the springs which have heretofore been used for this purpose, in that the springs J, J, have lips k, k, projecting from their upper ends which bear against the upper end of the stock c, in grooves which are continued up on each side of the solid portion of this stock c, as shown in Fig. 1; and m m are adjusting screws which pass respectively through the springs at intermediate points between the ends thereof and which are used to adjust the springs laterally so as to increase or to diminish their action upon the knives i, i, and also to adjust the springs and adapt them to tapering blocks E, of different widths. The adjusting screws m m have heads on them like ordinary screw bolts and the springs J, J, which are curved outward, bear against the heads of their adjusting screws and are by means of these screws clamped against the head of the stock c at their upper ends and against the knife bars at their lower ends.

It will be thus seen that the improvements in the cutter stock which I have made, consist, firstly, in passing the pressure rod which carries on its lower end the holder f up through the axis of block E through the stock c and through the spindle b, and applying the pressure in this rod, d, above the spindle, thereby enabling me to employ an adjustable collar, and to apply the action of a spring in a much better manner, as will be explained hereinafter; secondly, in applying the springs J, J, to the stock c, in such a manner, and in forming rack teeth on the knife bars into which the lower ends of the springs press, that the springs may be adjusted laterally, and that the knives i, i may be adjusted lengthwise, thereby, adapting the cutter stock to blocks E, of different widths for cutting large or small bungs, &c., and providing for the wearing away of the cutting points of the knives.

L, is the table on which the work to be cut is placed. This table is arranged horizontally under the cutter stock c, in front of the frame A A and it is secured to the top of a perpendicular bar K which plays up and down in the bearing blocks K' K'. The axis of this table bar K is in a line with the axis of the pressure rod d, therefore the pressure of this bar d, on the table will have no tendency to trip it out of its plane. n, n' are two rings, or collars, which are placed on the bar K, one above and the other below the lower bearing block K', and the collars n, n' are provided with set screws p, p by means of which these collars may be fixed to the bar K, at the desired points. These collars when thus adjusted and fixed to the table bar, will regulate the upward and downward movements of the table L, by alternately coming in contact with the stationary bearing K'. The back edge of the table L, touches the two side uprights of frame A, and these prevent the table from rotating.

r, is a ring, which is fixed to the perpendicular bar K above the collar n', and s, s, are two short arms which are jointed at their ends, respectively to the ring r, and to the forked end of a lever N, which lever projects toward the rear part of frame A, A, and has its fulcrum at t, in hanging bearings, which are secured to the two longitudinal side bars of frame A, A. The rear end of lever N, is connected with the treadle, P, by the rods N' N' and the treadle is pivoted at its rear end to a bottom cross bar of the frame A and proceeds forward and projects out a suitable distance from the front end of the frame A to be convenient for the foot of the operator. The front end of treadle P, is hung by a helical spring, S, which elevates this treadle after it has been depressed by the foot of the operator, and depresses the table L. The bed-piece T represented on the table L is a soft piece of wood to prevent the knives i, i from injuring the face of the table.

The operation of the entire machine is as follows: Rotary motion is communicated to the shaft B' from any convenient prime-mover, and this motion is transmitted through the shaft C', by belt C², to the vertical spindle b, on the lower end of which is secured, the cutter stock c, cutters or knives i i, tapering block, E, and springs J, J, and these parts are all rotated with the cutter stock. The diameter of the bungs to be cut by the knives i i are first determined, and a tapering block E of the proper width and taper, is placed on the lower end of the pressure rod by removing the holder f, and slipping the block E, upon the rod d, and then securing the holder in its place again on the lower end of this rod. The knives i i are slipped up on each side (tapering sides) of the block E, the required distance, and the ends of the springs J J catch into the teeth j j, on the knife bars, and confine these knives securely against the sides of said block. The collars n n' are next adjusted up or down on the table bar K, to give the required upward movement of the table, according to the thickness of the bungs to be cut on the table. The collar g, is then adjusted up or down on rod d, so that the holder f, will project below the points of knives i i. After these adjustments are properly made a square piece of cork wood or what is termed the "blank" is placed on the table, on the bed piece T, and properly adjusted by a gage thereon, so that its center will be directly under the axis of the holder f. The table L is then slowly elevated by pressure with the foot upon treadle P, and the holder f, first touches the blank, and as this holder is acted upon by the long spring I, through the medium of arm H, and rod d, it presses upon the blank and secures this blank in its place until the cutters have finished their work upon it and the table is depressed. The blank being thus held in its place on piece T, and prevented from rotating by the holder f, the table is still moved upward and the rod d, is pushed up carrying with it the tapering block E, which revolves around the rod d, with the block c, and the knives i, i. This upward movement of the block E, gradually separates the cutting points of knives i, i from each other at the same time these knives are cutting the bung, and this operation gives the tapering or conical form to the bung; when the knives have thus finished their work, the treadle P, is released and the spring S, returns the table to its original position to receive another blank to be formed into a bung as in the first operation. When the table is depressed by the spring S, the spring I will cause the blank holder f to follow the table until the nut or collar g, rests upon the top of spindle b, which will prevent the rod d, from falling any farther.

It will be seen from this description that the rod d which carries on its lower end the holder f does not itself rotate but that the block E stock c and spindle b rotate around this rod d while this rod is only allowed to have a vertical movement. The object of passing rod d up through the spindle b and applying the pressure of the spring outside and independently of the spindle, and cutter stock, is, that I am enabled to employ a much longer spring than could be used inside of the stock c, and by thus employing a long spring I obtain a more equitable pressure of the blank holder f upon the blank and thus prevent the blank from being crushed by this pressure when the holder $f$ is forced up to its highest point, as frequently occurs, in machines where the common arrangement of spring is used.

It will be readily seen that the springs J, J, will allow the knives $i, i$ to be adjusted lengthwise and that said knives may be readily removed for sharpening, and again replaced. The springs J, J, may also be adjusted by the set screws $m\ m$ so as to increase their pressure upon the knife bars, or to adapt them to blocks, E, of different widths and degrees of taper, all of which adjustments may be effected in a ready and simple manner.

I do not claim the use of expanding cutters for cutting pot corks, bungs, &c., irrespective of the arrangement shown, for expanding cutters have been previously used, although differently arranged from the plan shown. Neither do I claim broadly the use of a hollow mandrel containing a pressure rod within it; but What I do claim as new and desire to secure by Letters Patent, is—

1. The combination of the rod $d$, hollow cutter stock $c$, hollow spindle $b$, adjustable collar $g$, pivoted arm H, and spring I, the said parts being constructed and arranged in the manner and for the purposes herein shown and explained.

2. The adjustable knife springs J, J with the rack teeth $j$ on the knife bars $i, i$, when said springs are constructed and applied to the cutter stock as herein described, for the purpose set forth.

3. The combination of the treadle P, spring S, connecting rod N', lever N, jointed arms $s, s$, bar K, adjustable collars $n, n'$, and fixed bearings K', all constructed arranged and operating substantially as and for the purposes herein specified.

A. MILLAR.

Witnesses:
J. W. COOMBS,
M. M. LIVINGSTON.